United States Patent [19]

Siegenthaler

[11] Patent Number: 5,560,801
[45] Date of Patent: Oct. 1, 1996

[54] BUILDING DRUM WITH A METAL FORMING MODULE

[75] Inventor: Karl J. Siegenthaler, Rome, Italy

[73] Assignee: Bridgestone Corporation, Tokyo, Japan

[21] Appl. No.: 573,601

[22] Filed: Dec. 15, 1995

Related U.S. Application Data

[63] Continuation of Ser. No. 343,748, Nov. 22, 1994, abandoned.

[30] Foreign Application Priority Data

Dec. 30, 1993 [IT] Italy .................... TO93A1024

[51] Int. Cl.$^6$ .................................. B29D 30/26
[52] U.S. Cl. ................ 156/415; 156/414; 156/416; 156/417
[58] Field of Search ................ 156/414–420; 211/23, 24; 152/270, 275, 277–279, 283

[56] References Cited

U.S. PATENT DOCUMENTS

| | | | |
|---|---|---|---|
| 836,077 | 11/1906 | Aurand | 152/279 |
| 1,253,273 | 1/1918 | Nickerson | 152/283 |
| 1,577,664 | 3/1926 | Tew . | |
| 3,210,228 | 10/1965 | Bluck . | |
| 3,485,692 | 12/1969 | Frazier | 156/416 |
| 3,607,558 | 9/1971 | Nebout . | |
| 3,759,394 | 9/1973 | Hottle . | |
| 3,883,387 | 5/1975 | Csatlos . | |
| 3,963,394 | 6/1976 | Shichman et al. | 156/416 |
| 3,971,694 | 7/1976 | Gazuit | 156/416 |
| 4,547,251 | 10/1985 | Landsness . | |

FOREIGN PATENT DOCUMENTS

| | | |
|---|---|---|
| 1512891 | 3/1967 | France . |
| 2315384 | 6/1976 | France . |
| 2206911 | 8/1972 | Germany . |
| 485401 | 12/1936 | United Kingdom . |
| 1088866 | 10/1965 | United Kingdom . |
| 2020219 | 5/1979 | United Kingdom . |
| 2135640 | 1/1984 | United Kingdom . |

*Primary Examiner*—Geoffrey L. Knable
*Attorney, Agent, or Firm*—Carmen S. Santa Maria

[57] ABSTRACT

A building drum (1) wherein two half drums (9, 10) are moved equally and oppositely along the same axis (6) between a parted idle position and an adjacent forming position. Each half drum (9, 10) supports an annular end element (29) of a tubular, axially deformable forming module (28), an intermediate tubular body (30) which is defined by a number of side-by-side, partially superimposed metal blades (40) connecting the two annular end elements (29) and movable to and from a deformed position wherein the blades (40) define a toroidal body (48) substantially corresponding negatively in shape to that of a finished tire (49).

4 Claims, 3 Drawing Sheets

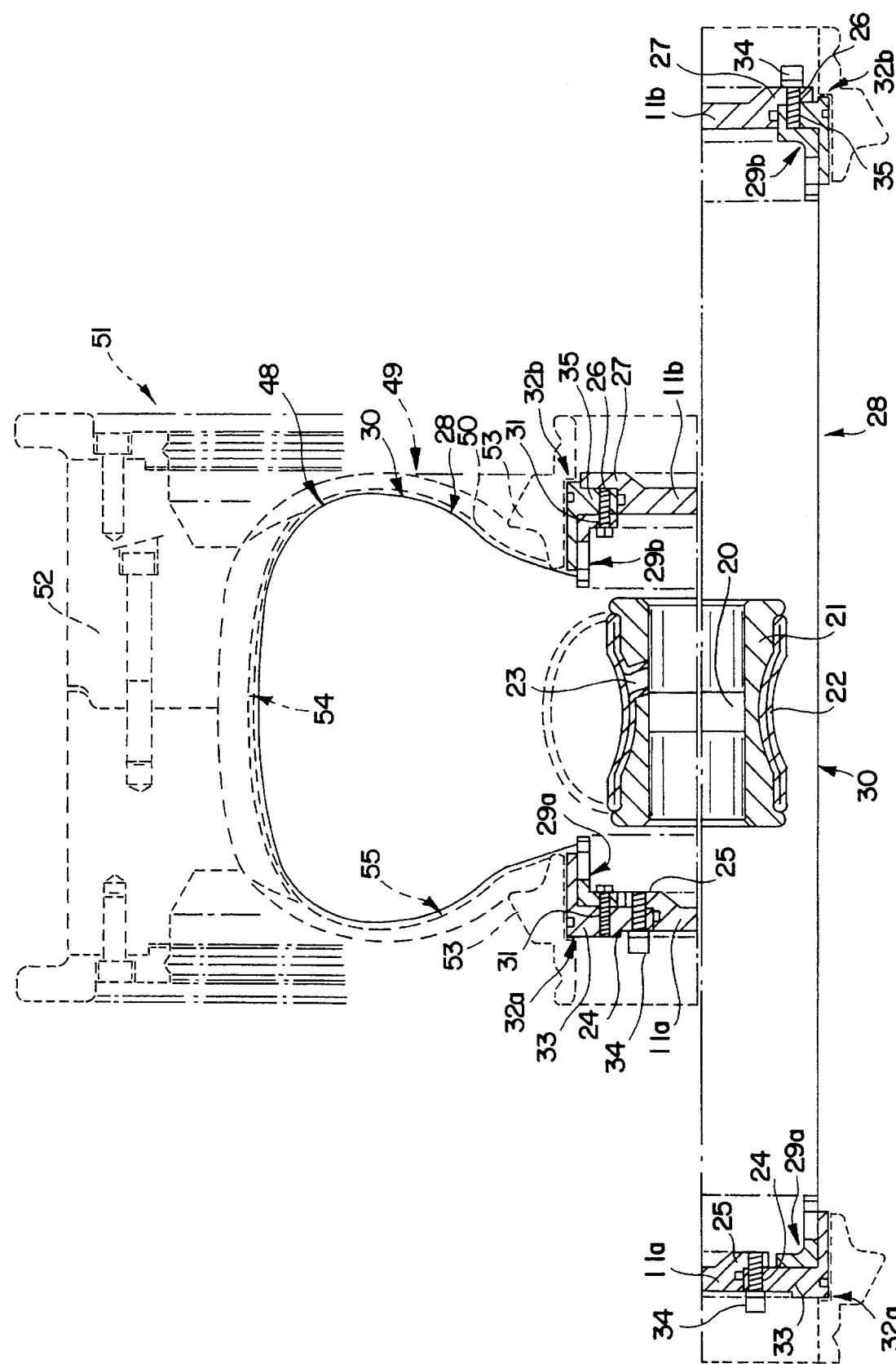

5,560,801

BUILDING DRUM WITH A METAL FORMING MODULE

This is a continuation of application Ser. No. 08/343,748 filed on Nov. 22, 1994, now abandoned.

BACKGROUND OF THE INVENTION

Technical Field

The present invention relates to a building drum. In particular, the present invention relates to a tire building drum of the type comprising a guide; two half drums mounted on and movable along the guide; a drive device for moving the two half drums equally and oppositely along the guide and between a parted idle position and an adjacent forming position; and forming means connected to the two half drums, and deformable for imparting a substantially finished toroidal shape to the tire.

SUMMARY OF THE INVENTION

It is an object of the present invention to perfect a tire building drum of the aforementioned type, in such a manner as to reduce the number of component parts, improve efficiency, and make it as economical as possible.

According to the present invention, there is provided a tire building drum comprising a guide; two half drums mounted on and movable along the guide; a drive device for moving the two half drums equally and oppositely along the guide and between a parted idle position and an adjacent forming position; and forming means connected to the two half drums, and deformable for imparting a substantially finished toroidal shape to the tire; characterized by the fact that the forming means comprise elastic means interposed between and deformable elastically by the two half drums.

According to a preferred embodiment of the above building drum, said forming means comprise a forming module, in turn comprising two annular end elements connected to the respective half drums, and an intermediate tubular body defined by said elastic means and connected at opposite ends to said annular end elements.

Preferably, the forming module is connected releasably to said half drums, and said elastic means comprise a number of side-by-side, partially superimposed elastic blades connecting said two end elements and deformable to and from a deformed position wherein the blades define a toroidal body substantially corresponding negatively in shape to that of a finished tire.

BRIEF DESCRIPTION OF THE DRAWINGS

A non-limiting embodiment of the present invention will be described by way of example with reference to the accompanying drawings, in which:

FIG. 2 shows a larger-scale schematic view of a detail in FIG. 1 in two different operating positions;

DESCRIPTION OF THE PREFERRED EMBODIMENT

Figure 1:
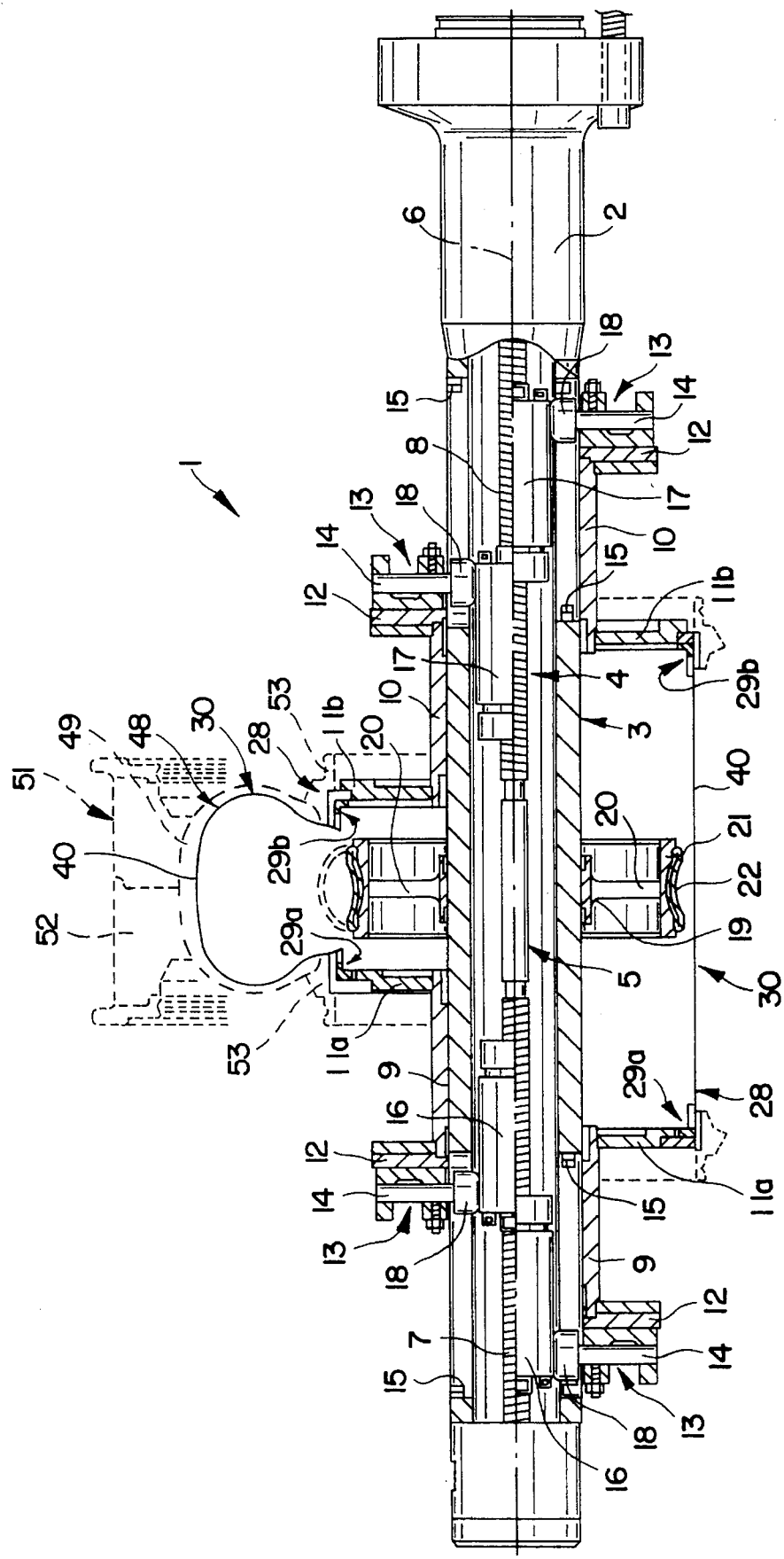
FIG. 1 shows an axial section of a preferred embodiment of the building drum according to the present invention.

Number 1 in FIG. 1 indicates a tire building drum comprising a central tubular guide shaft 2 defined externally by a cylindrical surface 3 and housing a drive unit 4. Unit 4 comprises a screw 5 extending along the axis 6 of shaft 2 and in turn comprising a central, externally smooth portion connecting two oppositely threaded portions 7 and 8.

Shaft 2 is fitted in a sliding manner with two tubular half drums 9 and 10 coaxial with axis 6, and each presenting, at opposite ends, two annular flanges 11 and 12. By means of respective pairs of connecting devices 13 on respective flanges 12, half drums 9 and 10 are connected to respective pins 14 extending radially in relation to axis 6, and engaging, in transversely sliding manner, respective axial openings 15 formed through shaft 2. Pins 14 constitute the output members of drive unit 4 which also comprises two nut screws 16 and 17 fitted respectively to portions 7 and 8 of screw 5 and connected integral with the inner ends of two respective pins 14; and four tappet rollers 18, each fitted idly to an intermediate portion of a respective pin. 14, and engaging in a sliding manner a respective opening 15.

As shown in FIG. 1, the intermediate portion of shaft 2 is fitted with a ring 19 contacting surface 3 and fitted with a number of spokes 20 extending radially outwards from ring 19 and supporting a second ring 21, in turn supporting an annular bladder 22 inflatable through a hole 23 formed through ring 21.

As shown more clearly in FIG. 2, flanges 11, of which the one connected to half drum 9 is indicated 11a, and the one connected to half drum 10 is indicated 11b, present substantially the same radial dimensions as spokes 20. More specifically, flange 11a is defined externally by a cylindrical surface 24, the radius of which is substantially equal to the inner radius of ring 21, and from the end of which facing flange 11b, there extends radially outwards an annular appendix 25 having substantially the same outer radius as ring 21. Flange 11b, on the other hand, is defined externally by a cylindrical surface 26, the radius of which is approximately equal to but no smaller than the outer radius of ring 21, and from the end of which opposite that facing flange 11a, there extends radially outwards an annular appendix 27 having a greater outer radius as compared with ring 21.

Figures 3A, 3B:
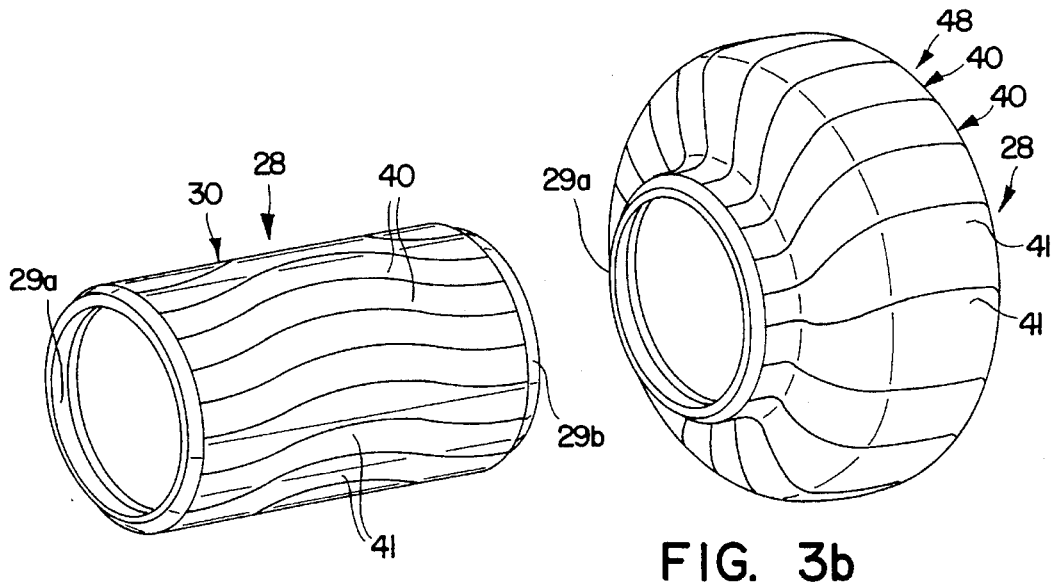
FIGS. 3a and 3b show schematic views in perspective of details of FIG. 1 in two different operating positions.

Flanges 11a and 11b support a forming module 28 which, as shown more clearly in FIGS. 2 and 3a, comprises two annular end elements 29, respectively indicated at 29a and 29b; and an intermediate tubular body 30 connected at opposite ends to annular elements 29.

As shown in FIG. 2, annular elements 29 present a substantially L-shaped section, and are fitted, by means of respective screws 31, inside respective rings 32, respectively indicated at 32a and 32b. Ring 32a is connected integral with respective flange 11a, and comprises an inner annular flange 33 coplanar with flange 11a, fitted through with respective screws 31, and with screws 34 connecting ring 32a to appendix 25, and presenting an inside diameter approximately equal to, but no smaller than, the diameter of surface 24. Ring 32b, on the other hand, comprises an annular flange 35 coplanar with flange 11b, fitted through with respective screws 31, and with screws 34 connecting ring 32b to appendix 27, and having an inside diameter approximately equal to, but no smaller than, the diameter of surface 26.

Figure 5A:
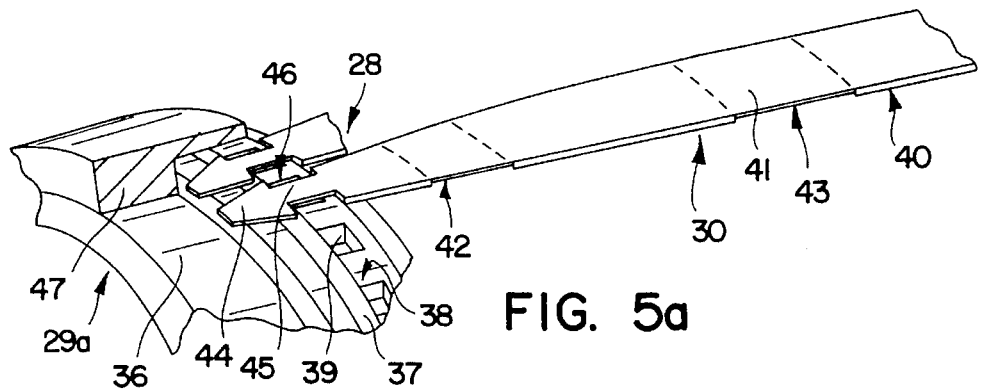
FIGS. 5a and 5b show larger scale views in perspective of details in FIG. 3 in two different operating positions.
Figure 5B:
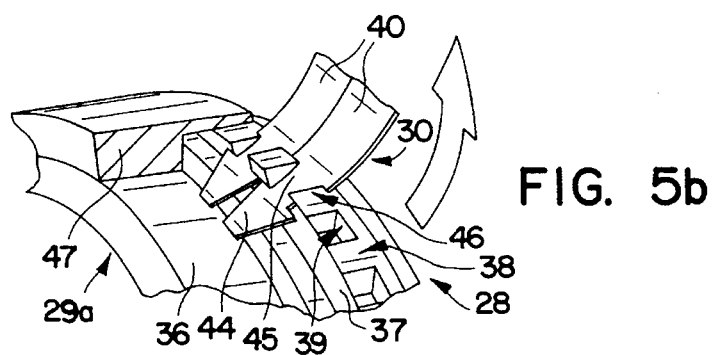

With reference to FIG. 5, each annular end element 29 comprises a cylindrical portion 36 from which an annular rib 37 projects outwards on the end of portion 36 facing the other annular element 29. Rib 37 presents a trapezoidal section with its longer base facing outwards, and is defined externally by a cylindrical surface 38 along which are formed a number of equally spaced U-shaped recesses 39 open on the opposite side to that facing the other annular element 29.

Figure 4:
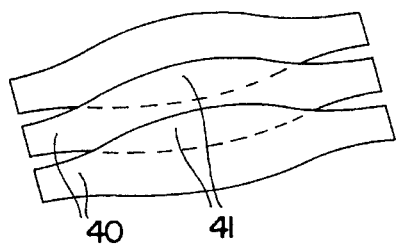

Again with reference to FIG. 5, tubular body 30 is defined by a number of side-by-side blades 40 which, as shown schematically in FIG. 4, present a wider central portion 41 overlapping the central portion 41 of the adjacent blade 40. Each blade 40 is formed from a metal strip of constant thickness, in which are formed three weakened portions: the first two 42 (of which only one is shown in FIG. 5) close to the opposite ends of blade 40, and the third 43 at central portion 41. At each end, each blade 40 presents a tapered, substantially trapezoidal end portion 44 from the longer base of which projects a narrow axial appendix 45 connecting end portion 44 to the rest of blade 40, and engaging a respective recess 39. In other words, engagement of appendix 45 inside respective recess 39 provides for axially securing respective blade 40 to respective annular element 29, and deforming a hinge 46 connecting blade 40 and element 29. Stable engagement of each appendix 45 inside respective recess 39 is assured by an annular hood 47, preferably made of resilient material and fitted over cylindrical portion 36 and rib 37 of each annular element 29.

In actual use, drive unit 4 provides for moving half drums 9 and 10 from a parted idle position as shown in the bottom half of FIGS. 1 and 2, to an adjacent forming position as shown in the top half of FIGS. 1 and 2. As shown in FIGS. 1 and 2, when half drums 9 and 10 are set to the parted idle position, blades 40 are substantially straight (FIG. 5a) so that intermediate tubular body 30 is undeformed and substantially cylindrical. Conversely, when half drums 9 and 10 are moved into the adjacent forming position, blades 40 are compressed axially by respective flanges 11a, 11b, and collapse under combined bending and compressive stress to assume the deformed configuration shown in FIG. 3b, and convert intermediate tubular body 30 into a toroidal body 48 substantially corresponding negatively in shape to that of a finished tire 49. The above deformation is ensured by bladder 22 which, as half drums 9 and 10 are moved into the adjacent position, is inflated to flex blades 40 slightly outwards to ensure that, under combined bending and compressive stress, they collapse outwards as opposed to inwards.

During deformation, the end portions of blades 40 rotate about the axes of the respective hinges, and weakened portions 42 and 43 ensure the blades are first deformed into a point at portions 42 and 43, and then rounded into an arc on contacting the inner surface of tire 49 being formed. This is especially useful in the event module 28 is used for applying a central innerliner 50 inside the carcass of a tire 49 formed as described in European Patent Application publication no. 0540048, i.e., inside a forming mold 51 comprising a toroidal outer portion 52, and two inner rings 53 supporting the bead portions of tire 49, and in turn supported on rings 32 of module 28. In this case in fact, gradual deformation of blades 40 as described above enables the innerliner (not shown) to adhere first to the central portion 54 of inner surface 55 of tire 49, and then along the rest of surface 55, so as to eliminate, through the sidewalls of the carcass of tire 49, any air between innerliner 50 and the carcass.

Finally, and as deducible from the foregoing description and FIG. 2, by simply releasing screws module 28 may be withdrawn from drum 1 in the direction of flange 11a; which characteristic, in addition to greatly simplifying any change in format, also enables removal of tire 49 together with module 28, which provides for internally reinforcing green tire 49, as well as for acting as a heat exchange wall for tire 49 during curing.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A tire building drum comprising:

a guide;

two half drums mounted on and movable along the guide;

a drive device for moving the two half drums equally and oppositely along the guide and between a parted idle position and an adjacent forming position;

forming means connected to the two half drums, and deformable for imparting a substantially finished toroidal shape to the tire; and said forming means comprising two annular end elements connected respectively to the half drums and elastic means interposed between and deformable elastically by the two half drums, said elastic means including a tubular body connected at opposite ends to the annular end elements, said elastic means being further defined by a number of side-by-side axially extending elastic blades connecting the two end elements and deformable to and from a deformed position wherein the blades define a toroidal body substantially corresponding negatively in shape to that of a finished tire when in the deformed position, each of said blades being a one-piece member having a substantially constant thickness with a pair of ends and a central portion, said central portion being wider in the circumferential direction and circumferentially overlapping the central portions of the adjacent blades when in the deformed position.

2. A building drum as claimed in claim 1, in which the forming module is connected releasably to said half drums.

3. A building drum as claimed in claim 1, in which each of said blades is formed from a metal strip of constant thickness, in which are formed three weakened portions, the first two of which are formed close to the opposite ends of the blade, and the third of which is formed at the central portion of the blade.

4. A building drum as claimed in claim 1, in which each of the blades is connected at each end to a respective one of said end elements by means of a hinge, each blade end having a trapezoidal portion forming a narrow portion connecting to the remainder of the blade; and in which said narrow portion is connected to the annular end element and forms said hinge.

\* \* \* \* \*